US009484004B2

(12) United States Patent
Singh et al.

(10) Patent No.: US 9,484,004 B2
(45) Date of Patent: Nov. 1, 2016

(54) DISPLAY CONTROLLER FOR DISPLAY PANEL

(71) Applicants: Chanpreet Singh, SAS Nagar (IN); Kshitij Bajaj, Sirsa (IN); Nakul Grover, New Delhi (IN); Michael A. Staudenmaier, Munich (DE)

(72) Inventors: Chanpreet Singh, SAS Nagar (IN); Kshitij Bajaj, Sirsa (IN); Nakul Grover, New Delhi (IN); Michael A. Staudenmaier, Munich (DE)

(73) Assignee: FREESCALE SEMIOCNDUCTOR, INC., Austin, TX (US)

( * ) Notice: Subject to any disclaimer, the term of this patent is extended or adjusted under 35 U.S.C. 154(b) by 68 days.

(21) Appl. No.: 14/624,529

(22) Filed: Feb. 17, 2015

(65) Prior Publication Data

US 2016/0240172 A1 Aug. 18, 2016

(51) Int. Cl.

| | |
|---|---|
| ***G09G 5/36*** | (2006.01) |
| ***G06T 1/20*** | (2006.01) |
| ***G09G 5/393*** | (2006.01) |
| ***G09G 3/32*** | (2016.01) |
| ***G09G 5/02*** | (2006.01) |
| ***G09G 5/06*** | (2006.01) |

(52) U.S. Cl.

CPC ............ *G09G 5/363* (2013.01); *G09G 3/3208* (2013.01); *G09G 5/026* (2013.01); *G09G 5/06* (2013.01); *G09G 5/393* (2013.01); *G09G 2320/0693* (2013.01); *G09G 2340/0457* (2013.01)

(58) Field of Classification Search

CPC ............... G09G 5/18; G09G 2330/06; G09G 2370/047; G09G 3/3674; G09G 5/363; H04N 5/126; H04N 21/42203; H04N 21/4223; H04N 21/4307; H04N 21/440281; H04N 21/4424; H04N 21/4621; H04N 5/06; H04N 5/44504; H04N 5/46; H04N 7/152; H04N 9/64; H03L 7/18

See application file for complete search history.

(56) References Cited

U.S. PATENT DOCUMENTS

| | | | | |
|---|---|---|---|---|
| 5,546,543 | A * | 8/1996 | Yang | G06F 13/362 709/234 |
| 6,549,948 | B1 | 4/2003 | Sasaki et al. | |
| 6,583,785 | B2 | 6/2003 | Yeh | |
| 6,970,151 | B1 | 11/2005 | Mosier | |
| 7,110,006 | B2 * | 9/2006 | MacInnis | G06T 9/007 345/519 |
| 7,136,109 | B2 | 11/2006 | Alkhalili | |
| 7,443,389 | B1 | 10/2008 | Alben | |
| 7,561,205 | B2 | 7/2009 | Wang | |
| 8,487,945 | B2 | 7/2013 | Courtney | |
| 2012/0271748 | A1 * | 10/2012 | DiSalvo | G06Q 40/04 705/37 |

FOREIGN PATENT DOCUMENTS

| | | |
|---|---|---|
| JP | 2013034039 A | 2/2013 |

* cited by examiner

*Primary Examiner* — Sing-Wai Wu

(74) *Attorney, Agent, or Firm* — Charles E. Bergere

(57) ABSTRACT

A display controller includes first and second arbitrating units, a pixel data calculating unit, a latency measurement unit, and a clock divider. The first and second arbitrating units fetch first and second pixel data corresponding to at least one pixel from an external memory via a system bus. The pixel data calculating unit determines a size of the first and second pixel data. The latency measuring unit generates a first data rate value that is indicative of a latency of the system bus based on the size of the first and second pixel data. The clock divider receives a first clock signal modulation value corresponding to the first data rate value and alters a modulation of a reference clock signal. The graphics blending unit receives the first and second pixel data and provides blended pixel data to a display panel based on a modulated clock signal.

19 Claims, 2 Drawing Sheets

DISPLAY CONTROLLER FOR DISPLAY PANEL

BACKGROUND OF THE INVENTION

The present invention generally relates to display panels, and, more particularly, to a display controller for driving a display panel.

Display panels are widely used in devices including watches, gaming consoles, computers, mobile phones, televisions, cameras, and in automobiles for displaying information, often using images. Examples of display panels include a liquid crystal display (LCD) panels, light emitting diode (LED) display panels, and plasma display panels.

A display panel is driven by an integrated circuit (IC) that includes a memory, a processor, a display controller, and a clock generator. The memory stores images to be displayed on the display panel in the form of graphic data layers. The graphic data layers, some of which may overlap, include pixel data that is blended and displayed on the display panel.

The processor provides access to the display controller for fetching the pixel data from the memory over a system bus. The display controller blends the pixel data and provides the blended pixel data to the display panel based on a clock signal (i.e., a "reference clock signal") generated by the clock generator. Spectral components of the reference clock signal contribute to electromagnetic interference (EMI) emissions or radiation. The EMI emissions may cause undesirable interference with other components of the display controller, the display panel, and other nearby circuits or electronic equipment. Generating the reference clock signal at a fixed frequency concentrates the energy of the radiation in a narrow spike having a large amplitude. The amplitude of the spike usually exceeds the EMI limit set by government agencies such as the Federal Communication Commission (FCC), which strictly regulates the amount of radiation or EMI emissions that an electronic device can generate. Further, in case of high resolution display panels, the size of the blended pixel data is large and requires higher clock rates, which leads to an increase in the intensity of the radiation and further contributes to increasing the amplitude of the spike.

One way to reduce EMI emissions is to vary or modulate the frequency of the reference clock signal, thereby generating a modulated clock signal, and provide the blended pixel data to the display panel using the modulated clock signal. In this case, the display controller includes a clock divider that modulates the frequency of the reference clock signal over a frequency range (also known as "frequency spectrum") based on a clock dividing ratio received from the processor. The processor varies the clock dividing ratio periodically over a range for modulating the frequency of the reference clock signal. As the frequency of the reference clock signal is varied periodically with time, the intensity of the radiation at a particular frequency is reduced, thereby reducing the amplitude of the spike at the particular frequency. This technique is known as spread spectrum. The maximum frequency range over which the frequency of the reference clock signal can be modulated is limited by a tolerance limit of the reference clock signal.

The display controller includes data buffers that buffer the blended pixel data and synchronize the transfer of the blended pixel data to a frequency of the modulated clock signal. When the number of graphic data layers containing pixel data is large, the size of the blended pixel data to be transferred to the display panel is large and hence, more pixel data must be fetched from the memory. If the frequency of the modulated clock signal is at a higher end of the frequency spectrum, the rate at which the blended pixel data is transferred to the display panel exceeds the rate at which the pixel data are fetched from the memory, which leads to under-run of the data buffers, resulting in visual artifacts.

Thus, it would be advantageous to have a display controller that modulates the reference clock signal based on the amount of pixel data being fetched from memory, thereby reducing data buffer under-runs.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
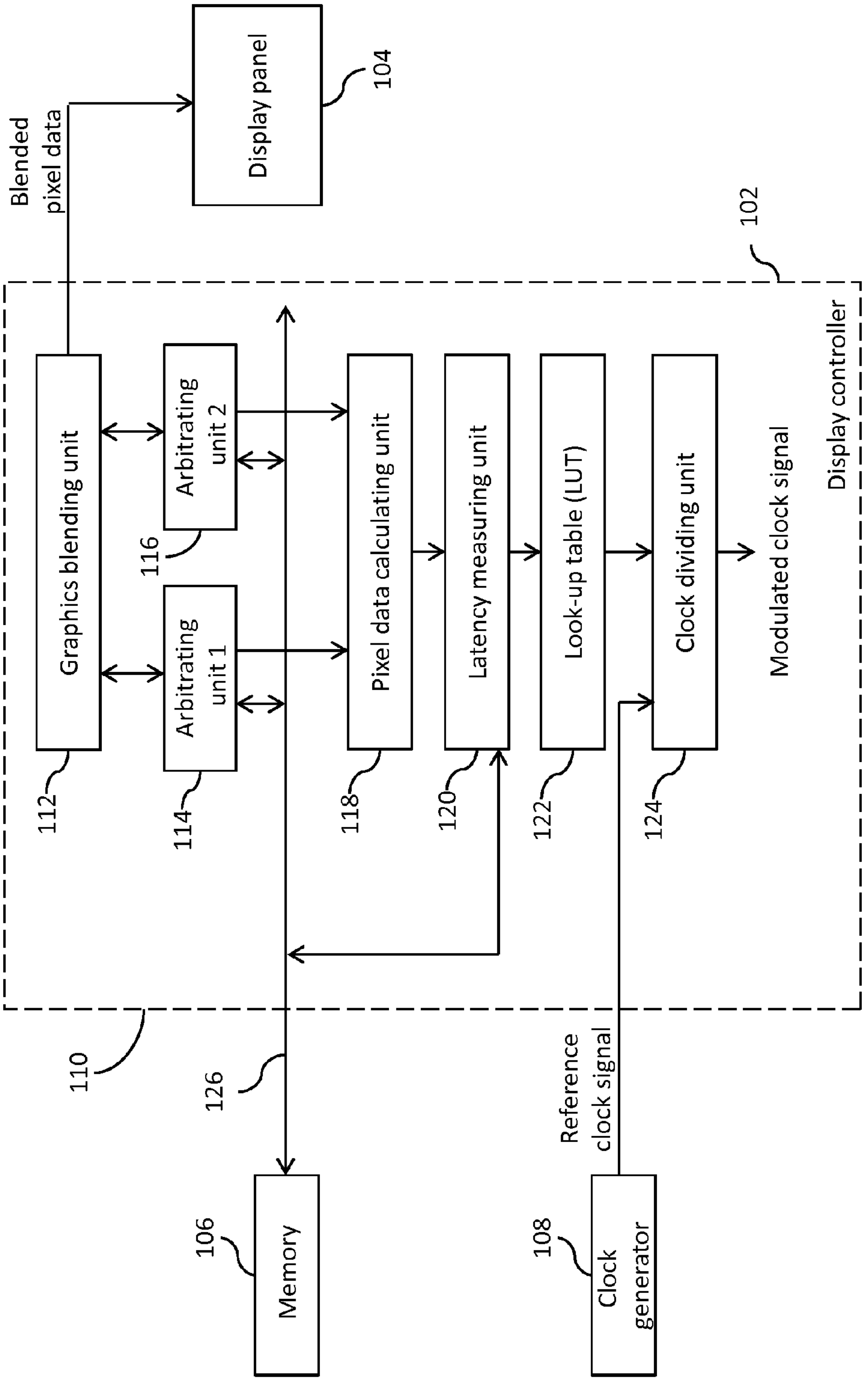
FIG. 1 is a schematic block diagram of an integrated circuit (IC) for modulating a reference clock signal to a display panel in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a display controller for modulating a reference clock signal to a display panel is provided. The display panel includes a plurality of pixels. The display controller includes a plurality of arbitrating units including first and second arbitrating units, a graphics blending unit, a pixel data calculating unit, a latency measurement unit, a look-up table (LUT), and a clock dividing unit. A memory stores a plurality of graphic data layers including first and second graphic data layers. The first and second graphic data layers include first and second pixel data corresponding to at least one pixel of the plurality of pixels, respectively. The first and second arbitrating units fetch the first and second pixel data, respectively, from the memory by way of a system bus. The graphics blending unit receives the first and second pixel data, blends the first and second pixel data, and generates blended pixel data corresponding to the at least one pixel. The pixel data calculating unit receives the first and second pixel data and determines a size of the first and second pixel data. The latency measuring unit generates a first data rate value based on the size of the first and second pixel data. The first data rate value is indicative of a latency of the system bus. The LUT stores a mapping between a set of data rate values including the first data rate value and corresponding clock signal modulation values. The clock divider receives a first clock signal modulation value corresponding to the first data rate value from the LUT, and alters a modulation of the reference clock signal based on the first clock signal modulation value to generate a modulated clock signal. The graphics blending unit provides the blended pixel data to the display panel based on the modulated clock signal.

In another embodiment, the present invention provides an integrated circuit (IC) for modulating a reference clock signal to a display panel. The display panel includes a plurality of pixels. The IC includes a memory, a clock generator, and a display controller. The memory stores a plurality of graphic data layers including first and second graphic data layers. The first and second graphic data layers include first and second pixel data corresponding to at least one pixel of the plurality of pixels, respectively. The clock generator generates the reference clock signal. The display controller includes a plurality of arbitrating units including first and second arbitrating units, a graphics blending unit, a pixel data calculating unit, a latency measurement unit, a look-up table (LUT), and a clock dividing unit. The first and second arbitrating units fetch the first and second pixel data, respectively, from the memory by way of a system bus. The graphics blending unit receives the first and second pixel data, blends the first and second pixel data, and generates blended pixel data corresponding to the at least one pixel. The pixel data calculating unit receives the first and second pixel data and determines a size of the first and second pixel data. The latency measuring unit generates a first data rate value based on the size of the first and second pixel data. The first data rate value is indicative of a latency of the system bus. The LUT stores a mapping between a set of data rate values including the first data rate value and corresponding clock signal modulation values. The clock divider receives a first clock signal modulation value corresponding to the first data rate value from the LUT, and alters a modulation of the reference clock signal based on the first clock signal modulation value to generate a modulated clock signal. The graphics blending unit provides the blended pixel data to the display panel based on the modulated clock signal.

In yet another embodiment, the present invention provides a method for modulating a reference clock signal to a display panel by a display controller. The display panel includes a plurality of pixels. An external memory includes a plurality of graphic data layers including first and second graphic data layers. The first and second graphic data layers include first and second pixel data corresponding to at least one pixel of the plurality of pixels. A look-up table (LUT) stores a mapping between a set of data rate values and corresponding clock signal modulation values. The method includes fetching first and second pixel data by the display controller by way of a system bus. The method further includes generating blended pixel data corresponding to the at least one pixel. The method further includes determining a size of the first and second pixel data. The method further includes generating a first data rate value based on the size of the first and second pixel data. The first data rate value is indicative of a latency of the system bus. The method further includes fetching a first clock signal modulation value corresponding to the first data rate value from the LUT. The method further includes altering a modulation of the reference clock signal based on the first clock signal modulation value to generate a modulated clock signal. The method further includes providing the blended pixel data to the display panel based on the modulated clock signal.

Various embodiments of the present invention provide a display controller for modulating a reference clock signal to a display panel. The display controller includes a plurality of arbitrating units including first and second arbitrating units, a graphics blending unit, a pixel data calculating unit, a latency measurement unit, a look-up table (LUT), and a clock dividing unit. The first and second arbitrating units fetch first and second pixel data corresponding to at least one pixel of a plurality of pixels from an external memory by way of a system bus. The graphics blending unit receives the first and second pixel data and generates blended pixel data corresponding to the at least one pixel. The pixel data calculating unit determines a size of the first and second pixel data. The latency measuring unit generates a first data rate value based on the size of the first and second pixel data. The first data rate value is indicative of a latency of the system bus. The clock divider receives a first clock signal modulation value corresponding to the first data rate value from the LUT and alters a modulation of the reference clock signal based on the first clock signal modulation value, thereby generating a modulated clock signal. The graphics blending unit provides the blended pixel data to the display panel based on the modulated clock signal.

The clock divider modulates a frequency of the reference clock signal over a frequency range (also known as "frequency spectrum"), and alters the modulation of the reference clock signal based on the first clock signal modulation value, thereby generating the modulated clock signal. The display controller includes data buffers that buffer the blended pixel data and synchronize the transfer of the blended pixel data to a frequency of the modulated clock signal. The clock divider generates the modulated clock signal such that the frequency of the modulated clock signal is towards a lower end of the frequency spectrum when the first data rate value is greater than a first threshold data rate value, thereby reducing the probability of under-run of the data buffers and hence, reducing visual artifacts. As the frequency of the reference clock signal is modulated over the frequency range, the radiations are within the EMI limit. Further, the display controller is assigned a high quality of service (QoS) level for fetching pixel data from the external memory over the system bus. High QoS level ensures that performance parameters such as latency of the system bus and error rate are within acceptable limits, thereby improving the performance of the display panel.

Referring now to FIG. 1, a schematic block diagram of an integrated circuit (IC) 102 for modulating a reference clock signal to a display panel 104 in accordance with an embodiment of the present invention is shown. The display panel 104 may comprise a liquid crystal display (LCD) panel, a light emitting diode (LED) display panel, and a plasma display panel, for example. The display panel 104 may be used in devices including smart watches, gaming consoles, computers, mobile phones, televisions, cameras, and in display systems for vehicles such as automobiles.

The IC 102 includes a memory 106, a clock generator 108, and a display controller 110. The display controller 110 includes a graphics blending unit 112, a plurality of arbitrating units including first and second arbitrating units 114 and 116, a pixel data calculating unit 118, a latency measuring unit 120, a look-up table (LUT) 122, and a clock divider 124.

The display panel 104 includes a plurality of pixels. The memory 106 stores multiple graphic data layers including first and second graphic data layers, which include first and second pixel data, respectively. The first and second pixel data may correspond to a single pixel or a set of pixels of the display panel 104. The first and second pixel data may include information, in the form of binary values that indicates intensity of primary (red, green and blue, RGB) colors for the pixel. The clock generator 108 generates a reference clock signal.

The first and second arbitrating units 114 and 116 are connected to a processor (not shown) for receiving first and second sets of data, respectively. The first and second sets of data may be generated by the processor or may be a part of the first and second pixel data. The first set of data includes data such as a size of the first graphic data layer and a position of the first graphic data layer on the display panel 104. The second set of data includes data such as a size of the second graphic data layer and a position of the second graphic data layer on the display panel 104. The first and second arbitrating units 114 and 116 are further connected to the memory 106 by way of a system bus 126 for fetching the first and second pixel data based on the first and second sets of data, respectively.

The graphics blending unit 112 is connected to the first and second arbitrating units 114 and 116 for receiving the first and second pixel data. The graphics blending unit 112 blends the first and second pixel data based on first and second data and generates blended pixel data. The blended pixel data corresponds to the pixel or the set of pixels represented by the first and second pixel data. The first and second data indicate opacity of the first and second pixel data. The graphics blending unit 112 provides the blended pixel data to the display panel 104 based on a modulated clock signal.

The pixel data calculating unit 118 is connected to the first and second arbitrating units 114 and 116 for receiving the first and second pixel data. The pixel data calculating unit 118 determines a size of the first and second pixel data.

The latency measuring unit 120 is connected to the pixel data calculating unit 118 and the system bus 126 for generating a first data rate value based on the size of the first and second pixel data. The first data rate value indicates a latency of the system bus 126. The latency measuring unit 120 may generate the first data rate value based on an algorithm such as a moving average algorithm, for example.

The LUT 122 stores a mapping between a set of data rate values including the first data rate value and corresponding clock signal modulation values. The LUT 122 may be pre-programmed to store the mapping. In one embodiment, the set of data rate values includes first through fifth data rate values and corresponding first through fifth clock signal modulation values as shown in Table A.

TABLE A

| Data rate | Clock signal modulation values |
|---|---|
| 80 | 1.02 |
| 70 | 1.01 |
| 60 | 1 |
| 50 | 0.99 |
| 40 | 0.98 |

The clock divider 124 receives a first clock signal modulation value corresponding to the first data rate value from the LUT 122 and alters the modulation of the reference clock signal based on the first clock signal modulation value for generating the modulated clock signal. The clock divider 124 may include at least one of a phase-locked loop (PLL) circuit, a delay-locked loop (DLL) circuit, and a fractional clock divider circuit for modulating the reference clock signal. The clock divider 124 modulates the frequency of the reference clock signal over a frequency range, i.e., frequency spectrum. In an embodiment of the present invention, the frequency of the reference clock signal is either incremented or decremented by a fixed value.

In one example, the frequency of the reference clock signal is 100 MHz, the first data rate value is 80, the first threshold data rate value is 60, and the frequency spectrum over which the clock divider 124 modulates the frequency of the reference clock signal is 98-102 megahertz (MHz). Thus, the clock divider 124 receives the first clock signal modulation value of 1.02 corresponding to the first data rate value of 80 from the LUT 122 and modulates the frequency of the reference clock signal towards the lower end of the frequency spectrum, i.e., 98 MHz by dividing the reference clock signal with the first clock signal modulation value of 1.02.

The IC 102 further includes data buffers (not shown) that buffer the blended pixel data and synchronize the transfer of the blended pixel data to a frequency of the modulated clock signal. When the first data rate value is greater than a first threshold data rate value, the clock divider 124 modulates the frequency of the reference clock signal towards a lower end of the frequency spectrum. Modulating the frequency of the reference clock signal towards the lower end of the frequency spectrum decreases the rate at which the blended pixel data is provided to the display panel 104, thereby reducing the probability of under-run of the data buffers and hence, reducing visual artifacts. The clock divider 124 may modulate the frequency of the reference clock signal towards a higher end of the frequency spectrum when the first data rate value is less than a second threshold data rate value.

In an embodiment of the present invention, graphic data layers that are stored in the memory 106 are assigned priority based on the importance of the graphic data layers. The first and second arbitrating units 114 and 116 fetch pixel data corresponding to a pixel based on the priority of the graphic data layers.

In an example, the first graphic data layer includes pixel data corresponding to a first pixel and does not include pixel data corresponding to a second pixel. The second graphic data layer includes pixel data corresponding to the first and second pixels. A third graphic data layer stored in the memory 106 includes pixel data corresponding to the second pixel. In this case, the first graphic data layer is assigned the highest priority, the second graphic data layer is assigned the second highest priority, and so on. Thus, the first and second arbitrating units 114 and 116 fetch the pixel data corresponding to the first pixel from the first and second graphic data layers, respectively, and provide the pixel data corresponding to the first pixel to the graphics blending unit 112. Subsequently, the first and second arbitrating units 114 and 116 fetch the pixel data corresponding to the second pixel from the second and third graphic data layers, respectively, and provide the pixel data corresponding to the first pixel to the graphics blending unit 112.

In another embodiment, the processor calculates a section of a maximum frequency range based on at least one of the size of the first and second graphic data layers, the position of the first and second graphic data layers on the display panel 104, and an average latency of the system bus 126. Further, the display controller 110 may be assigned a high quality of service (QoS) level for fetching pixel data from the memory 106 over the system bus 126. High QoS level ensures that performance parameters such as latency of the system bus 126 and error rate are within acceptable limits, thereby improving the performance of the display panel 104.

Thus, when the number of graphics data layers containing pixel data corresponding to a pixel is large, the size of the blended pixel data to be transferred to the display panel 104 is large. The clock divider 124 modulates the frequency of the reference clock signal towards the lower end of the frequency spectrum, thereby reducing the rate at which the blended pixel data is transferred to the display panel 104.

This reduces the probability of under-run of the data buffers and hence, reduces visual artifacts.

Figure 2:
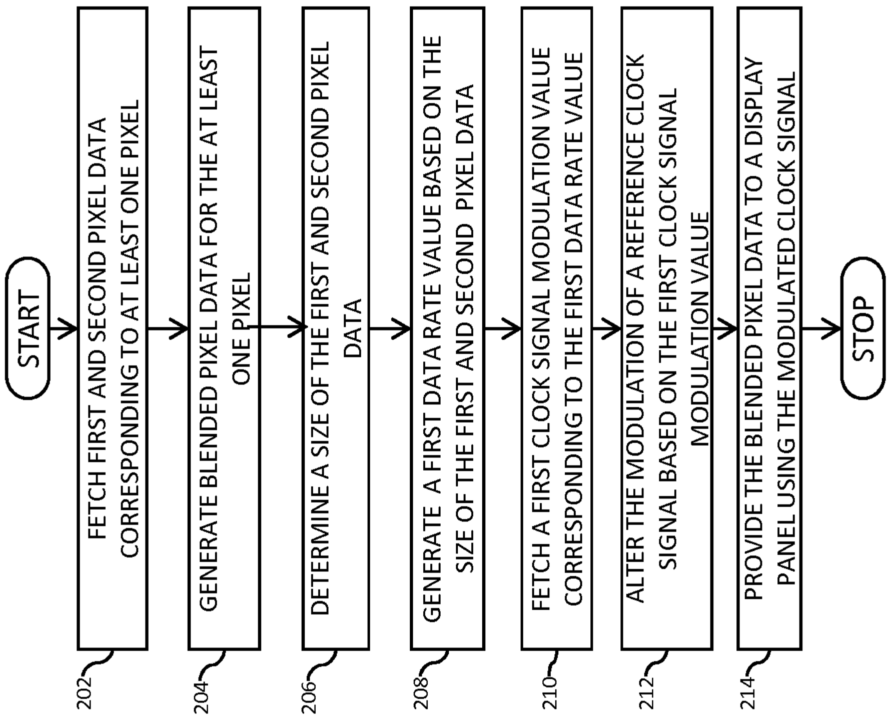
FIG. 2 is a flow chart illustrating a method for modulating a reference clock signal to the display panel of FIG. 1 in accordance with an embodiment of the present invention.

Referring now to FIG. 2, a flow chart illustrating a method for modulating the reference clock signal to the display panel 104 in accordance with an embodiment of the present invention is shown.

At step 202, the first and second arbitrating units 114 and 116 fetch the first and second pixel data corresponding to the at least one pixel, respectively, by way of the system bus 126. At step 204, the graphics blending unit 112 generates the blended pixel data corresponding to the at least one pixel. At step 206, the pixel data calculating unit 118 determines the size of the first and second pixel data. At step 208, the latency measuring unit 120 generates the first data rate value that is indicative of the latency of the system bus 126 based on the size of the first and second pixel data. At step 210, the clock divider 124 receives the first clock signal modulation value corresponding to the first data rate value from the LUT 122. At step 212, the clock divider 124 alters the modulation of the reference clock signal based on the first clock signal modulation value, thereby generating the modulated clock signal. At step 214, the graphics blending unit 112 provides the blended pixel data to the display panel 104 based on the modulated clock signal.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A display controller for modulating a reference clock signal to a display panel, wherein the display panel includes a plurality of pixels, the display controller comprising:

a plurality of arbitrating units connected to an external memory by way of a system bus and including first and second arbitrating units, wherein the external memory stores a plurality of graphic data layers including first and second graphic data layers, and wherein the first and second graphic data layers include first and second pixel data corresponding to at least one pixel of the plurality of pixels, respectively, and wherein the first and second arbitrating units fetch the first and second pixel data from the external memory, respectively;

a graphics blending unit connected to the first and second arbitrating units for receiving and blending the first and second pixel data, and generating blended pixel data corresponding to the at least one pixel;

a pixel data calculating unit connected to the first and second arbitrating units for receiving the first and second pixel data, and determining a size of the first and second pixel data;

a latency measuring unit, connected to the pixel data calculating unit and the system bus, for generating a first data rate value based on the size of the first and second pixel data, wherein the first data rate value is indicative of a latency of the system bus;

a look-up table (LUT) that stores a mapping between a set of data rate values including the first data rate value and corresponding clock signal modulation values; and a clock divider for receiving a first clock signal modulation value corresponding to the first data rate value from the LUT, and altering a modulation of the reference clock signal based on the first clock signal modulation value to generate a modulated clock signal, wherein the graphics blending unit provides the blended pixel data to the display panel based on the modulated clock signal.

2. The display controller of claim 1, wherein the clock divider generates the modulated clock signal at a frequency that is less than a frequency of the reference clock signal when the first data rate value is greater than a first threshold data rate value.

3. The display controller of claim 1, wherein the clock divider generates the modulated clock signal at a frequency that is greater than a frequency of the reference clock signal when the first data rate value is less than a second threshold data rate value.

4. The display controller of claim 1, wherein the clock divider comprises at least one of a phase-locked loop circuit, a delay-locked loop circuit, and a fractional clock divider circuit.

5. The display controller of claim 1, wherein the latency measuring unit generates the first data rate value using a moving average algorithm.

6. The display controller of claim 1, wherein the first and second arbitrating units fetch the first and second pixel data, respectively, based on at least one of a size of the first and second graphic data layers and a position of the first and second graphic data layers on the display panel.

7. The display controller of claim 1, wherein the clock divider generates the modulated clock signal by dividing the reference clock signal with the first clock signal modulation value.

8. The display controller of claim 1, wherein the first and second arbitrating units fetch the first and second pixel data, respectively, based on priority of the first and second graphic data layers, wherein the first graphic data layer has a higher priority than the second graphic data layer if the first graphic layer includes pixel data corresponding to a first pixel and does not include pixel data corresponding to a second pixel, and the second graphic data layer includes pixel data corresponding to the first and second pixels.

9. An integrated circuit for modulating a reference clock signal to a display panel, wherein the display panel includes a plurality of pixels, the integrated circuit comprising:

a memory for storing a plurality of graphic data layers including first and second graphic data layers, wherein the first and second graphic data layers include first and second pixel data corresponding to at least one pixel of the plurality of pixels;

a clock generator for generating the reference clock signal; and a display controller connected to the clock generator and the memory by way of a system bus, wherein the display controller includes:

a plurality of arbitrating units connected to the memory and including first and second arbitrating units, wherein the first and second arbitrating units fetch the first and second pixel data from the memory;

a graphics blending unit connected to the first and second arbitrating units for receiving and blending the first and second pixel data, and generating blended pixel data corresponding to the at least one pixel;

a pixel data calculating unit connected to the first and second arbitrating units for receiving the first and second pixel data, and determining a size of the first and second pixel data;

a latency measuring unit, connected to the pixel data calculating unit and the system bus, for generating a first data rate value based on the size of the first and second pixel data, wherein the first data rate value is indicative of a latency of the system bus;

a look-up table (LUT) that stores a mapping between a set of data rate values including the first data rate value and corresponding clock signal modulation values; and a clock divider for receiving a first clock signal modulation value corresponding to the first data rate value from the LUT, and altering a modulation of the reference clock signal based on the first clock signal modulation value to generate a modulated clock signal, wherein the graphics blending unit provides the blended pixel data to the display panel based on the modulated clock signal.

10. The integrated circuit of claim 9, wherein the clock divider generates the modulated clock signal at a frequency that is less than a frequency of the reference clock signal when the first data rate value is greater than a first threshold data rate value.

11. The integrated circuit of claim 9, wherein the clock divider generates the modulated clock signal at a frequency that is greater than a frequency of the reference clock signal when the first data rate value is less than a second threshold data rate value.

12. The integrated circuit of claim 9, wherein the clock divider comprises at least one of a phase-locked loop circuit, a delay-locked loop circuit, and a fractional clock divider circuit.

13. The integrated circuit of claim 9, wherein the latency measuring unit generates the first data rate value based on a moving average algorithm.

14. The integrated circuit of claim 9, wherein the first and second arbitrating units fetch the first and second pixel data based on at least one of a size of the first and second graphic data layers and a position of the first and second graphic data layers on the display panel.

15. A method for modulating a reference clock signal to a display panel by a display controller, wherein the display panel includes a plurality of pixels, the method comprising:

fetching first and second pixel data corresponding to first and second graphic data layers of a plurality of graphic data layers stored in a memory, by the display controller by way of a system bus, wherein the first and second graphic data layers include the first and second pixel data corresponding to at least one pixel of the plurality of pixels, respectively;

generating blended pixel data corresponding to the at least one pixel;

determining a size of the first and second pixel data;

generating a first data rate value based on the size of the first and second pixel data, wherein the first data rate value is indicative of a latency of the system bus;

fetching a first clock signal modulation value corresponding to the first data rate value from a look-up table (LUT), wherein the LUT stores a mapping between a set of data rate values including the first data rate value and corresponding clock signal modulation values;

altering a modulation of the reference clock signal based on the first clock signal modulation value to generate a modulated clock signal; and providing the blended pixel data to the display panel based on the modulated clock signal.

16. The method of claim 15, wherein the modulated clock signal is generated at a frequency that is less than a frequency of the reference clock signal when the first data rate value is greater than a first threshold data rate value.

17. The method of claim 15, wherein the modulated clock signal is generated at a frequency that is greater than a frequency of the reference clock signal when the first data rate value is less than a second threshold data rate value.

18. The method of claim 15, wherein the first data rate value is generated using a moving average algorithm.

19. The method of claim 15, wherein the first and second pixel data are fetched based on at least one of a size of the first and second graphic data layers and a position of the first and second graphic data layers on the display panel.

* * * * *